(12) United States Patent
Shimojoh

(10) Patent No.: US 10,571,729 B2
(45) Date of Patent: Feb. 25, 2020

(54) DISPLAY DEVICE

(71) Applicant: SHARP KABUSHIKI KAISHA, Sakai, Osaka (JP)

(72) Inventor: Kazuya Shimojoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/224,508

(22) Filed: Dec. 18, 2018

(65) Prior Publication Data

US 2019/0187511 A1 Jun. 20, 2019

(30) Foreign Application Priority Data

Dec. 19, 2017 (JP) .................................. 2017-242664

(51) Int. Cl.
*G02F 1/1333* (2006.01)

(52) U.S. Cl.
CPC .................. *G02F 1/133308* (2013.01); *G02F 2001/13332* (2013.01); *G02F 2001/133314* (2013.01); *G02F 2001/133317* (2013.01); *G02F 2201/46* (2013.01)

(58) Field of Classification Search
CPC ... G02F 1/133308; G02F 2001/133314; G02F 2001/13332; G02F 2001/133317; G02F 2201/46
See application file for complete search history.

(56) References Cited

U.S. PATENT DOCUMENTS

| | | | | |
|---|---|---|---|---|
| 2005/0151894 A1* | 7/2005 | Katsuda | ............ | G02F 1/133308 349/58 |
| 2014/0160393 A1* | 6/2014 | Zhang | ................ | G02F 1/133308 349/58 |
| 2015/0103286 A1* | 4/2015 | Cho | ................... | G02F 1/133308 349/58 |
| 2016/0018692 A1* | 1/2016 | Park | ................... | G02F 1/133615 349/58 |

FOREIGN PATENT DOCUMENTS

JP 2006-323807 A 11/2006

* cited by examiner

*Primary Examiner* — Rockshana D Chowdhury
(74) *Attorney, Agent, or Firm* — ScienBiziP, P.C.

(57) ABSTRACT

A display device includes a display module, a module holder, and at least one spacer. The display module includes a display panel and a panel holder. The display panel is configured to display images. The panel holder includes a frame portion that surrounds the display panel and a pair of panel holding portions to sandwich an outer edge portion of the display panel in a thickness direction of the display panel. The module holder includes a pair of module holding portions to sandwich an outer edge portion of the display module in the thickness direction. The spacer is disposed between the frame portion and at least one of the module holding portions so that the at least one of the module holding portions remains separated from at least one of the panel holding portions.

10 Claims, 4 Drawing Sheets

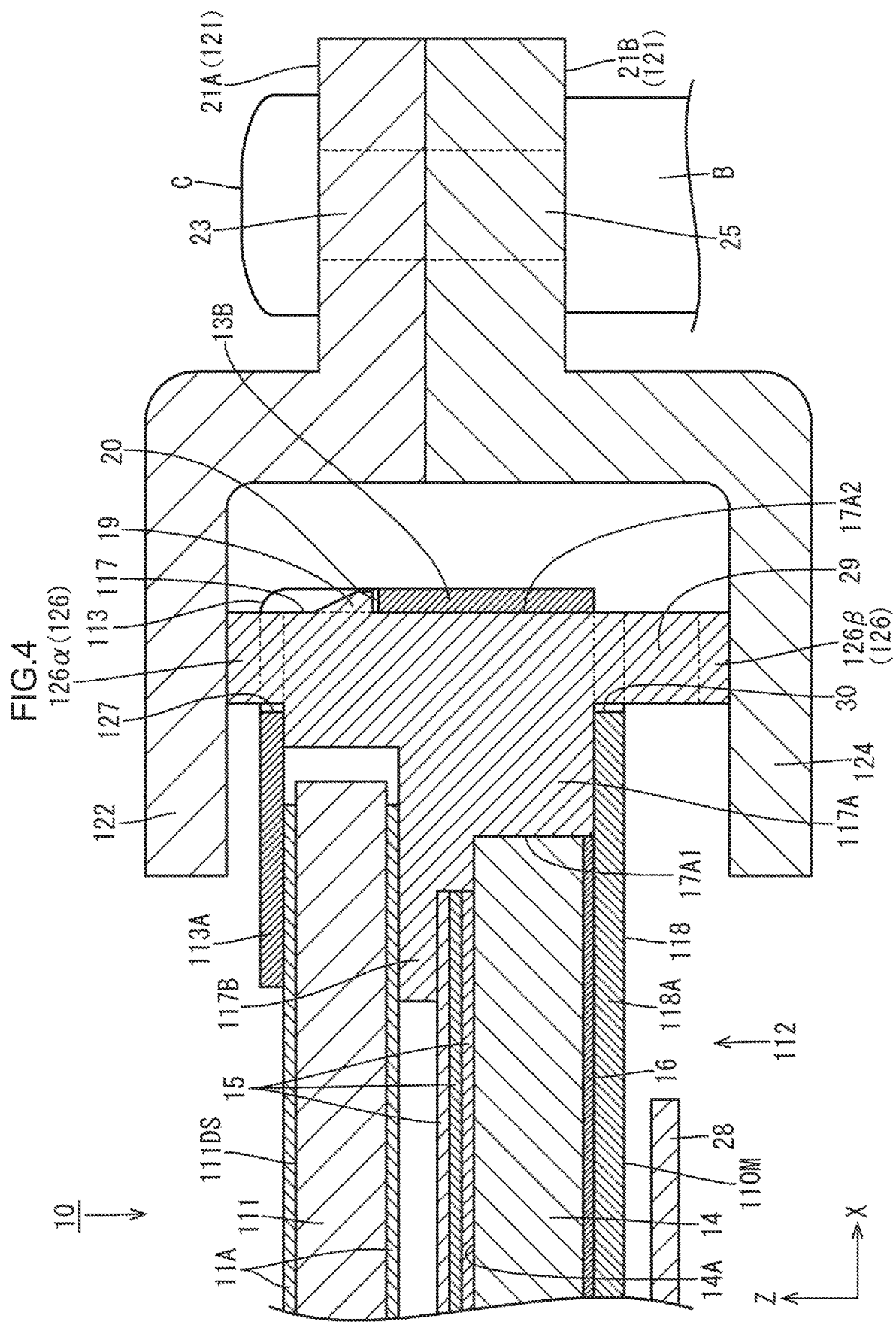

DISPLAY DEVICE

CROSS REFERENCE TO RELATED APPLICATION

This application claims priority from Japanese Patent Application No. 2017-242664 filed on Dec. 19, 2017. The entire contents of the priority application are incorporated herein by reference.

TECHNICAL FIELD

The technology described herein relates to a display device.

BACKGROUND

A known display device is included in a display portion of an electronic device. The display device includes a first case and a second case. The first case includes an opening and covers the front surface of the display device. The second case covers the back surface of the display device. The first case includes a frame portion that surrounds the opening and sidewalls that extends from the entire perimeter of the frame portion toward the second case at a right angle. The display device is placed on the frame portion and surrounded by the sidewalls. The display device includes holding tabs, at least two of which are fixed to the sidewalls to press down the display device. An example of such a display is disclosed in Japanese Unexamined Patent Application Publication No. 2006-323807.

In the display portion, the display device is sandwiched between the first case and the second case and held by the first case and the second case. Therefore, the first case and the second case may apply a stress to the display device resulting in display defects.

SUMMARY

The technology described herein was made in view of the above circumstances. An object is to provide a display device in which display quality of a display panel is less likely to be degraded due a stress.

The display device includes a display module a module holder, and at least one spacer. The display module includes a display panel and a panel holder. The display panel is configured to display images. The panel holder includes a frame portion that surrounds the display panel and a pair of panel holding portions to sandwich an outer edge portion of the display panel in a thickness direction of the display panel. The module holder includes a pair of module holding portions to sandwich an outer edge portion of the display module in the thickness direction. The spacer is disposed between the frame portion and at least one of the module holding portions so that the at least one of the module holding portions remains separated from at least one of the panel holding portions.

In the display module, the display panel is held by the panel holder with the panel holding portions sandwiching the outer edge portion of the display panel in the thickness direction. The display module is held by the display module holder with the display module holding portions sandwiching the outer edge portion of the display module in the thickness direction. The panel holder and the display panel are components of the display module and thus the panel holding portions are attached to the display panel with high accuracy. Therefore, a stress exerted on the display panel due to the holding of the display panel with the panel holding portions is less likely to affect display quality. Attachment of the module holding portions of the module holder to the display module with high accuracy is difficult. Therefore, a stress exerted on the display panel due to the holding of the outer edge portion of the display module with the module holding portions may affect the display quality. With the spacer disposed between the frame portion and the at least one of the module holding portions, the at least one of the module holding portions remains separated from the at least one of the panel holding portions, the stress is less likely to be exerted on the display panel. According to the configuration, the display panel is less likely to have display defects resulting from the stress.

According to the technology described herein, a display device in which display quality of a display panel is less likely to be degraded due a stress is provided.

BRIEF DESCRIPTION OF THE DRAWINGS

FIG. 4 is a cross-sectional view of an edge portion of the liquid crystal display device.

DETAILED DESCRIPTION

First Embodiment

Figure 1:
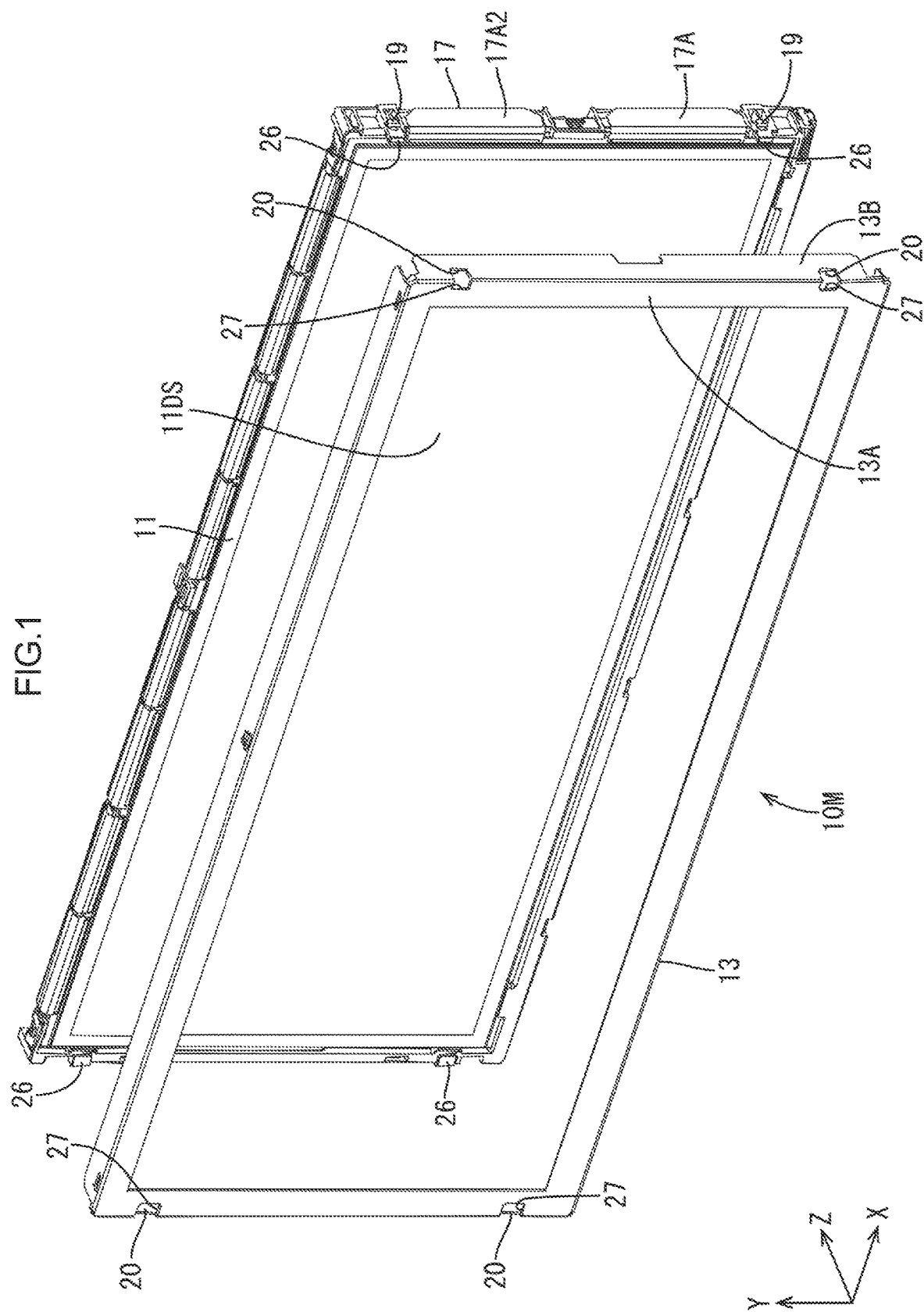
FIG. 1 is an exploded perspective view of a liquid crystal module included in a liquid crystal display device according to a first embodiment.

A first embodiment will be described with reference to FIGS. 1 and 2. In this section, a liquid crystal display device 10 (a display device) will be described. The X axes, the Y axes, and the Z axes may be present in the drawings. The axes in each drawing correspond to the respective axes in other drawings to indicate the respective directions. An upper side and a lower side in FIG. 2 correspond to a front side and a back side of the liquid crystal display device 10, respectively.

The liquid crystal display device 10 includes a liquid crystal module 10M illustrated in FIG. 1. The liquid crystal module 10M includes at least a liquid crystal panel 11 (a display panel a backlight unit 12 (a lighting device), and a bezel 13. The liquid crystal panel 11 includes a display surface 11DS for displaying images. The backlight unit 12 is an external light source for supplying light to the liquid crystal panel 11 for image display. The bezel 13 holds the liquid crystal panel 11 to the backlight unit 12. The liquid crystal panel 11 has a horizontally-long rectangular shape in a plan view. The liquid crystal panel 11 has a known configuration including a liquid crystal layer sealed between glass substrates. The liquid crystal panel 11 is disposed such that a long direction, a short direction, and a thickness direction of the liquid crystal panel 11 correspond with the X-axis direction, the Y-axis direction, and the z-axis direction, respectively. Polarizing plates 11A are attached to outer surfaces of the liquid crystal panel 11 on the front side and the back side (see FIG. 2).

The backlight unit 12 includes light sources such as LEDs. As illustrated in FIG. 2, the backlight unit 12 further includes an optical member configured to exert an optical effect on light from the light sources toward the liquid crystal panel 11. The optical member includes a light guide plate 14, and optical sheets 15 (three sheets in FIG. 2), and a reflection sheet 16 light guide plate 14 is con-figured to guide the light from the light sources. The optical sheets 15 are disposed in front of the light guide plate 14 and configured to exert the optical effect on the light from the light guide plate 14. The reflection sheet 16 is disposed behind the light guide plate 14 and configured to reflect light rays toward the inner side of the light guide plate 14. The light guide plate 14 includes one of end surfaces configured as a light entering end surface through which the light from the light sources enters. The light guide plate 14 includes a front plate surface that is configured as a light exiting plate surface 14A through which the light exits. The light guide plate 14 guides light rays that are emitted by the light sources and enter the light guide plate 14 through the light entering end surface along the light exiting plate surface 14A and then toward the light exiting plate surface 14A so that planar light exits from the light exiting plate surface 14A toward the liquid crystal panel 11. The optical sheets 15 are disposed on top of each other on the light exiting plate surface 14A of the light guide plate 14. The optical sheets 15 may include a diffuser, a lens sheet, and a reflection type polarizing sheet. The reflection sheet 16 is disposed over the back plate surface of the light guide plate 14.

Figure 2:
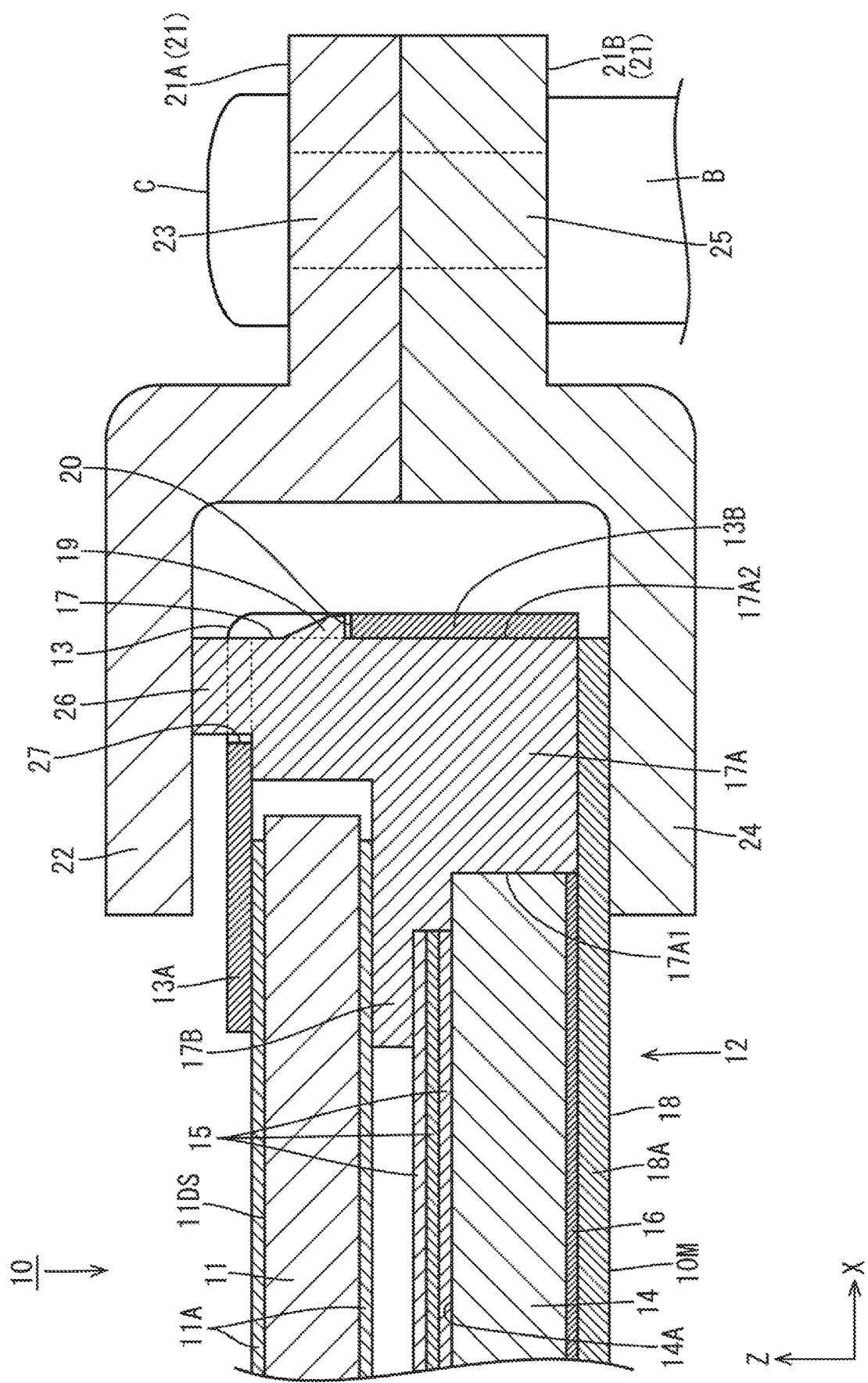
FIG. 2 is a cross-sectional view of an edge portion of the liquid crystal display device.

As illustrated in FIG. 2, the backlight unit 12 includes a frame 17 (a module holder) and a chassis 18 (a module holder). The frame collectively surrounds the optical member and the liquid crystal panel 11. The chassis 18 supports the optical member and the frame 17 from the back side. The frame 17 is made of synthetic resin. The frame 17 includes a frame portion 17A and an opposite-side panel holding portion 17B (a panel holding portion). The frame portion 17A has a horizontally-long frame shape that extends along perimeters of the optical member and the liquid crystal panel 11. The opposite-side panel holding portion 17B is disposed behind the outer edge portion of the liquid crystal panel 11, that is, on an opposite side from a display surface 11DS side. The frame portion 17A of the frame 17 includes inner side surfaces 17A1 opposed to outer end surfaces of the optical member and the liquid crystal panel 11. Each inner side surface 17A1 has a dimension in the Z-axis direction greater than a sum of dimensions of the optical member and the liquid crystal panel 11 in the Z-axis direction. A back section of the frame portion 17A surrounding the optical member has a width greater than a width of a front section of the frame portion 17A surrounding the liquid crystal panel 11. Locking tabs 19 protrude from outer side surfaces 17A2 of the frame portion 17A (on opposite sides from the liquid crystal panel 11). As illustrated in FIG. 1, the locking tabs 19 are located closer to ends of the short-side sections of the frame portion 17A extending in the Y-axis direction. As illustrated in FIG. 2, the opposite-side panel holding portion 17B of the frame 17 protrudes inward from the inner side surfaces 17A1 of the frame portion 17A to overlap the outer edge portions of the liquid crystal panel 11 from, the back side to support the liquid crystal panel 11 from the back side in the Z-axis direction. The opposite-side panel holding portion 17B presses the light guide plate 14 and the optical sheets 15 of the optical member from the front side in the Z-axis direction. The opposite-side panel holding portion 17B are disposed between the liquid crystal panel 11 and the optical member in the Z-axis direction to maintain a gap between the liquid crystal panel 11 and the optical member constant. The chassis 18 is prepared by shaping a metal plate. The chassis 18 includes a bottom 18A that is disposed to overlap the optical member and the frame portion 17A of the frame 17 from the back side to collectively support the optical member and the frame portion 17A from the back side in the Z-axis direction. The reflection sheet 16 is sandwiched between the light guide plate 14 and the bottom 18A of the chassis 18.

Next, the bezel 13 will be described. As illustrated in FIG. 1, the bezel 13 is prepared by forming a metal plate into a horizontally-long frame shape along outer edge portions of the liquid crystal panel 11. As illustrated in FIG. 2, the bezel 13 has an L-shaped cross section. The bezel 13 includes a display surface-side panel holding portion 13A (a panel holding portion) and short side portions 13B. The display surface-side panel holding portion 13A is disposed on the display surface 11DS side relative to the liquid crystal panel 11. The short side portions 13B are opposed to the outer side surfaces 17A2 of the frame portion 17A. The display surface-side panel holding portion 13A has a plate shape parallel to the display surface 11DS of the liquid crystal panel 11. The display surface-side panel holding portion 13A is disposed to overlap the outer edge portions of the liquid crystal panel 11 on the front side to press the liquid crystal panel 11 in the Z-axis direction from the front side. The liquid crystal panel 11 is sandwiched between the display surface-side panel holding portion 13A of the bezel 13 and an opposite-side panel holding portion 17B of the frame 17 in the Z-axis direction from the front side and the back side to hold the liquid crystal panel 11 of the liquid crystal module 10M. The short side portions 13B have plate shapes. The short side portions 13B are parallel to the outer side surfaces 17A2 of the frame portion 17A of the frame 17 (in the Z-axis direction). The short side portions 13B are coupled with the outer edge sections of the display surface-side panel holding portion 13A and disposed on the outer side surfaces 17A2 of the frame portion 17A, respectively. The short side portions 13B include locking holes 20 for receiving locking tabs 19 of the frame portion 17A. The locking holes 20 are formed in the short side portions 13B that extend in the Y-axis direction and at positions closer to ends of the short side portions 13B away from each other in the Y-axis direction. The locking holes 20 are located closer to the front edges of the short side portions 13B. With the locking tabs 19 locked to hole edges of the locking holes 20, respectively, the bezel 13 remains held to the frame 17.

As illustrated in FIG. 2, the liquid crystal display device 10 includes a module holder 21 for holding the liquid crystal module 10M. The module holder 21 has a horizontally-long frame shape along the outer edge portions of the liquid crystal module 10M. The module holder 21 includes a first member 21A and a second member 21B having frame shapes. The second member 21B is disposed behind the first member 21A. The first member 21A and the second member 21B are fixed together with a screw C that is screwed in a boss B. The boss B may be included in, but not limited to, a movable arm for transferring the liquid crystal display device 10. The first member 21A includes a display surface-side module holding portion 22 (a module holding portion) and a first boss fixing portion 23. The first member 21A is disposed on the front side (the display surface 11DS side) relative to the liquid crystal module 10M. The first boss fixing portion 23 is fixed to the boss B. The second member 21B includes an opposite-side module holding portion 24 (a module holding portion) and a second boss fixing portion 25. The opposite-side module holding portion 24 is disposed on the back side relative to the liquid crystal module 10M. The second boss fixing portion 25 is fixed to the boss B. The display surface-side module holding portion 22 and the opposite-side module holding portion 24 are opposed to each other with a space in the Z-axis direction. The liquid crystal module 10M is disposed in the space. The liquid crystal module 10M is sandwiched by the display surface-side module holding portion 22 and the opposite-side module holding portion 24 in the Z-axis direction and held. The display surface-side module holding portion 22 is disposed over the outer edge portions of the liquid crystal module 10M on the front side to press the liquid crystal module 10M in the Z-axis direction from the front side. The opposite-side module holding portion 24 is disposed over the outer edge portions of the liquid crystal module 10M on the back side to press the liquid crystal module 10M in the Z-axis direction from the back side. The first boss fixing portion 23 and the second boss fixing portion 25 are disposed on top of each other such that the back surface of the first boss fixing portion 23 and the front surface of the second boss fixing portion 25 contact each other. The first boss fixing portion 23 and the second boss fixing portion 25 include through holes that communicate with each other. The screw C is passed through the through holes.

As described above, in the liquid crystal display device 10, the liquid crystal panel 11 is sandwiched between the display surface-side panel holding portion 13A of the bezel 13 and the opposite-side panel holding portion 17B of the frame 17. Furthermore, the liquid crystal module 10M is disposed between the display surface-side module holding portion 22 and the opposite-side module holding portion 24 of the module holder 21. Because the bezel 13 and the frame 17 are components of the liquid crystal module 10M, the display surface-side panel holding portion 13A and the opposite-side panel holding portion 17B are fixed to the liquid crystal panel 11 with high accuracy. Therefore, degradation in display quality due to stresses exerted on the liquid crystal panel 11 due to the holding of the liquid crystal panel 11 with the display surface-side panel holding portion 13A and the opposite-side panel holding portion 17B is very small. However, it difficult to fix the display surface-side module holding portion 22 and the opposite-side module holding portion 24 to the liquid crystal module 10M with high accuracy. Therefore, display quality may be degraded by stresses exerted on the outer edge portions of the liquid crystal module 10M sandwiched by the display surface-side module holding portion 22 and the opposite-side module holding portion 24. If the liquid crystal module 10M shipped by a manufacturer is held by the module holder 21 designed and produced by an orderer of the liquid crystal module 10M, it is difficult to fix the module holder 21 to the liquid crystal module 10M with high accuracy. Therefore, a large stress may be exerted on the plate surface and pooling, which is one type of display unevenness, may occur.

As illustrated in FIG. 2, the liquid crystal display device 10 includes spacers 26 (display surface-side spacers). The spacers 26 are disposed between the frame portion 17A of the frame 17 and the display surface-side module holding portion 22 of the module holder 21. The spacers 26 are integrally formed with the frame portion 17A of the frame 17 to protrude from the front surface of the frame portion 17A toward the front side. According to the configuration, the display surface-side module holding portion 22 on the display surface 11DS side with respect to the liquid crystal module 10M remains separated from the display surface-side panel holding portion 13A. Therefore, a stress is less likely to be exerted on the display surface 11DS of the liquid crystal panel 11 and thus the pooling or other types of display unevenness is less likely to occur. This configuration is preferable for reducing occurrence of degradation in display quality.

As illustrated in FIG. 2, the display surface-side panel holding portion 13A of the bezel 13 is disposed over the frame portion 17A from which the spacers 26 protrude includes spacer holes 27 (display-side holes) through which the spacers 26 are passed. Each of the spacers 26 has a height measuring from the frame portion 17A greater than a thickness of the display surface-side panel holding portion 13A. The spacers 26 are passed through the spacer holes 27 in the display surface-side panel holding portion 13A of the bezel 13 to contact the back surface of the display surface-side module holding portion 22. According to the configuration, the display surface-side module holding portion 22 remains separated from the display surface-side panel holding port 13A of the bezel 13. Furthermore, the spacer holes communicate with the locking holes 20, respectively. Specifically, each spacer hole 27 and the corresponding locking hole 20 extend from the display surface-side panel holding portion 13A to the corresponding short side portion 13B. Widths of openings of spacer holes 27 and the locking holes 20 are substantially equal to each other. Namely, opening edges of each spacer hole 27 and the corresponding locking hole 20 linearly continue to each other (see FIG. 1). In the production of the bezel 13, a cost for forming the locking holes 20 and the spacer holes 27 can be reduced.

As illustrated in FIG. 1, the spacers 26 are provided in short-side sections of the frame portion 17A of the frame 17 at positions closer to ends of the short-side sections that extend in the Y-axis direction. Namely, four spacers 26 are arranged to be separated from one another in a perimeter of the frame portion 17A. The spacer holes 27 are provided in short-side sections of the display surface-side panel holding portion 13A of the bezel 13 at positions closer to ends of the short-side sections that extend in the Y-axis direction. Namely, four spacer holes 27 are arranged to be separated from one another in a perimeter of the display surface-side panel holding portion 13A. In comparison to a configuration in which a spacer extends along an entire perimeter of the frame portion 17A, the spacers 26 arranged at points on the frame portion 17A have less contact areas relative to the display surface-side module holding portion 22. If the liquid crystal module thermally expands or contracts due to a variation in thermal environment, abnormal noise may be produced through rubbing of the spacer and the display surface-side module holding portion. Because the spacers 26 have the less contact areas, the abnormal noise can be reduced. The spacers 26 are integrally formed with the frame portion 17A. If a foreign object approaches the liquid crystal panel 11 in the liquid crystal module 10M that is before shipping and the module holder 21 is not fixed to the liquid crystal module 10M, the spacers 26 contact the foreign object before the foreign objects touches the liquid crystal module 10M. The liquid crystal panel 11 is protected by the spacers 26.

As described above, the liquid crystal display device 10 (the display device) includes the liquid crystal panel 11 (the display panel), the bezel 13, the frame 17, the module holder 21, and the spacers 26. The liquid crystal panel 11 displays images. The bezel 13 includes the display surface-side panel holding portion 13A. The frame 17 includes the opposite-side panel holding portion 17B. The display surface-side panel holding portion 13A and the opposite-side panel holding portion 17B sandwich the frame portion 17A that surrounds the liquid crystal panel 11 and the outer edge portions of the liquid crystal panel 11 the thickness direction. The bezel 13 and the frame 17 forming the panel holder and the liquid crystal panel 11 are the components of the liquid crystal module 10m (the display module). The module holder 21 includes the display surface-side module holding portion 22 and the opposite-side module holding portion 24 that sandwich the outer edge portion of the liquid crystal module 10M in the thickness direction. The spacers 26 are disposed between the frame portion 17A and the display surface-side module holding portion 22, which is at least one of the module holding portions, to hold the display surface-side module holding portion 22 to be separated from the display surface-side panel holding portion 13A, which is at least one of the module holding portions.

According to the configuration, the liquid crystal panel 11 is held by the display surface-side panel holding portion 13A and the opposite-side panel holding portion 17B that sandwich the outer edge portions of the liquid crystal panel 11 in the thickness direction. The liquid crystal panel 11, the bezel that includes the display surface-side panel holding portion 13A, and the frame 17 that includes the opposite-side panel holding portion 17B are the components of the liquid crystal module 10M. The liquid crystal module 10M is held by the display surface-side module holding portion 22 and the opposite-side module holding portion 24 that sandwich the outer edge portions of the liquid crystal module 10M in the thickness direction. Because the bezel 13, the frame 17, and the liquid crystal panel 11 are the components of the liquid crystal module 10M, the display surface-side panel holding portion 13A and the opposite-side panel holding portion 17B can be fixed to the liquid crystal panel 11 with high accuracy. Therefore, degradation in display quality due to stresses exerted on the liquid crystal panel 11 through the holding of the liquid crystal panel 11 with the display surface-side panel holding portion 13A and the opposite side panel holding portion 17B is very small. However, it is difficult to fix the display surface-side module holding portion 22 and the opposite-side module holding portion 24 to the liquid crystal module 10M with high accuracy. Therefore, display quality may be degraded by stresses exerted on the outer edge portions of the liquid crystal module 10M sandwiched by the display surface-side module holding portion 22 and the opposite-side module holding portion 24. With the spacers 26 disposed between the frame portion 17A and the display surface-side module holding portion 22, the display surface-side module holding portion 22 remains separated from the display surface-side panel holding portion 13A. Therefore, a stress is less likely to be exerted on the liquid crystal panel 11 and thus the liquid crystal panel 11 is less likely to have display defects resulting from the stress.

The spacers 26 (the display surface-side spacers) are disposed between the frame portion 17A and the display surface-side module holding portion 22 that is disposed on the display surface 11DS side farther from the opposite-side module holding portion 24 relative to the liquid crystal panel 11. With the spacers 26, the display surface-side module holding portion 22 disposed on the display surface 11DS side relative to the liquid crystal module 10M remains separated from the display surface-side panel holding portion 13A. Therefore, a stress is less likely to be exerted on the display surface 11DS side of the liquid crystal panel 11. This configuration is preferable for reducing the occurrence of the decrease in display quality of the liquid crystal panel 11.

The holding members include the bezel 13 and the frame 17. The bezel 13 includes the display surface-side panel holding portion 13A (the panel holding portion) disposed on the display surface 11DS side relative to the liquid crystal panel 11. The frame 17 includes the frame portion 17A and the opposite-side panel holding portion 17B (the panel holding portion) disposed on the opposite side from the display surface 11DS side relative to the liquid crystal panel 11. The display surface-side panel holding portion 13A of the bezel 13 includes the spacer holes 27 (the display surface-side holes) for passing the spacers 26. The spacers 26 are passed through the spacer holes 27 in the display surface-side panel holding portion 13A of the bezel 13 and disposed between the frame portion 17A of the frame 17 and the display surface-side module holding portion 22 disposed on the display surface 11DS side relative to the liquid crystal panel 11. According to the configuration, the display surface-side module holding portion 22 disposed on the display surface 11DS side relative to the liquid crystal module 10M remains separated from the display surface-side panel holding portion 13A of the bezel 13.

The frame 17 includes the locking tabs 19 that protrude from the outer side surfaces 17A2 of the frame portion 17A on the opposite sides from the liquid crystal panel 11. The bezel 13 includes the short side portions 13B opposed to the outer side surfaces 17A2 of the frame portion 17A. The short side portions 13B include the locking holes 20 that communicate with the spacer holes 27. The locking holes 20 receive the locking tabs 19 that are locked to the hole edges of the locking holes 20. When the bezel 13 is attached to the frame 17, the locking holes 20 in the short side portions 13B opposed to the outer side surfaces 17A2 receive the locking tabs 19 that protrude from the outer side surfaces 17A2 of the frame portion 17A. With the locking tabs 19 locked to the hole edges of the locking holes 20, the bezel 13 remains held to the frame 17. The bezel 13 includes the locking holes 20 in the short side portions 13B to communicate with the spacer holes 27 in the display surface-side panel holding portion 13A. According to the configuration, a cost for forming the locking holes 20 and the spacer holes 27 can be reduced.

The spacers 26 are arranged to be separated from one another in the perimeter of the frame portion 17A. In comparison to the configuration in which a spacer extends along an entire perimeter of the frame portion 17A, the spacers 26 arranged at the points on the frame portion 17A have less contact areas relative to the display surface-side module holding portion 22. If the liquid crystal module thermally expands or contracts due to a variation in thermal environment, abnormal noise may be produced through rubbing of the spacer and the display surface-side module holding portion. Because the spacers 26 have the less contact areas, the abnormal noise can be reduced.

The spacers 26 are integrally formed with the frame portion 17A. If a foreign object approaches the liquid crystal panel 11 the liquid crystal module 10M that is before shipping and the module holder 21 is not fixed to the liquid crystal module 10M, the spacers 26 contact the foreign object before the foreign objects touches the liquid crystal module 10M. The liquid crystal panel 11 is protected by the spacers 26.

Second Embodiment

A second embodiment will be described with reference to FIGS. 3 and 4. The second embodiment includes a frame 117 having a configuration different from the configuration of the frame 17 in the first embodiment. Configurations, functions, and effects similar to those of the first embodiment will not be described.

As illustrated in FIG. 4, a liquid crystal module 110M according to this embodiment includes a control circuit board 28 for controlling image display on a liquid crystal panel 111. The control circuit board 28 is disposed behind a backlight unit 112 and fixed to a bottom 118A of a chassis 118 included in the backlight unit 112 with a predetermined gap. The control circuit board 28 is connected to the liquid crystal panel 111 on the front side via a flexible circuit board. As illustrated in FIG. 3, the control circuit board 28 has a horizontally-long plate shape. Various electronic components are mounted on a plate surface of the control circuit board 28. Conductive lines are routed on the plate surface of the control circuit board 28. A long dimension of the control circuit board 28 is less than long dimensions of the liquid crystal panel 111 and the backlight unit 112; however, the control circuit board 28 overlap large portions of the liquid crystal panel 111 and the backlight unit 112 with respect to the X-axis direction.

As illustrated in FIG. 4, a frame portion 117A of the frame 117 includes four circuit board protecting portions 29 for protecting the control circuit board 28. As illustrated in FIG. 3, the circuit board protecting portions 29 protrude from back surfaces of short-side sections of the frame portion 117A in the Z-axis direction at positions outer than the control circuit board 28. The short-side sections extend in the Y-axis direction. The circuit board protecting portions 29 are disposed to sandwich the control circuit board 28 from sides with respect to the long-side direction of the control circuit board 28. The circuit board protecting portions 29 have rib shapes that extend for predetermined lengths in the Y-axis direction. The circuit board protecting portions 29 on the left side in FIG. 3 have the lengths greater than the lengths of the circuit board protecting portions 29 on the right side in FIG. 3. The circuit board protecting portions 29 are located at ends of the short-side sections of the frame portion 117A with respect to the Y-axis direction. According to the configuration, even if a foreign object approaches the control circuit board 28 in the Z-axis direction from the back side, the foreign object contacts the circuit board protecting portion 29 before contacting the control circuit board 28. Therefore, the foreign object is less likely to contact the control circuit board 28. With the circuit board protecting portions 29, the control circuit board 28 is protected.

As illustrated in FIG. 4, spacers 126 include display surface-side spacers 126α and opposite-side spacers 126β. The display surface-side spacers 126α are disposed between the frame portion 117A of the frame 117 and a display surface-side module holding portion 122 of a module holder 121. The opposite-side spacers 126β are disposed between the frame portion 117A of the frame 117 and an opposite-side module holding portion 124 of the module holder 121. The display surface-side spacers 126α have the same configuration as that of the display surface-side spacers 26 in the first embodiment and thus will not be described in detail. The opposite-side spacers 126β protrude from the circuit board protecting portions 29 of the frame portion 117A in the Z-axis direction. Namely, the opposite-side spacers 126β protrude from the circuit board protecting portions 29 enhance the protection performance of the circuit board protecting portions 29. With the display-side spacers 126α disposed between the frame portion 117A and the display surface-side module holding portion 122, the display surface-side module holding portion 122 remains separated from a display surface-side panel holding portion 113A. With the opposite-side spacers 126β disposed between the frame portion 117A and the opposite-side module holding portion 124, the opposite-side module holding portion 124 remains separated from an opposite-side panel holding portion 117B. According to the configuration, stresses are less likely to be exerted on a display surface 111DS of the liquid crystal panel 111 and an opposite surface on an opposite side from the display surface 111DS This configuration is preferable for maintaining display quality of the liquid crystal panel 111.

Figure 3:
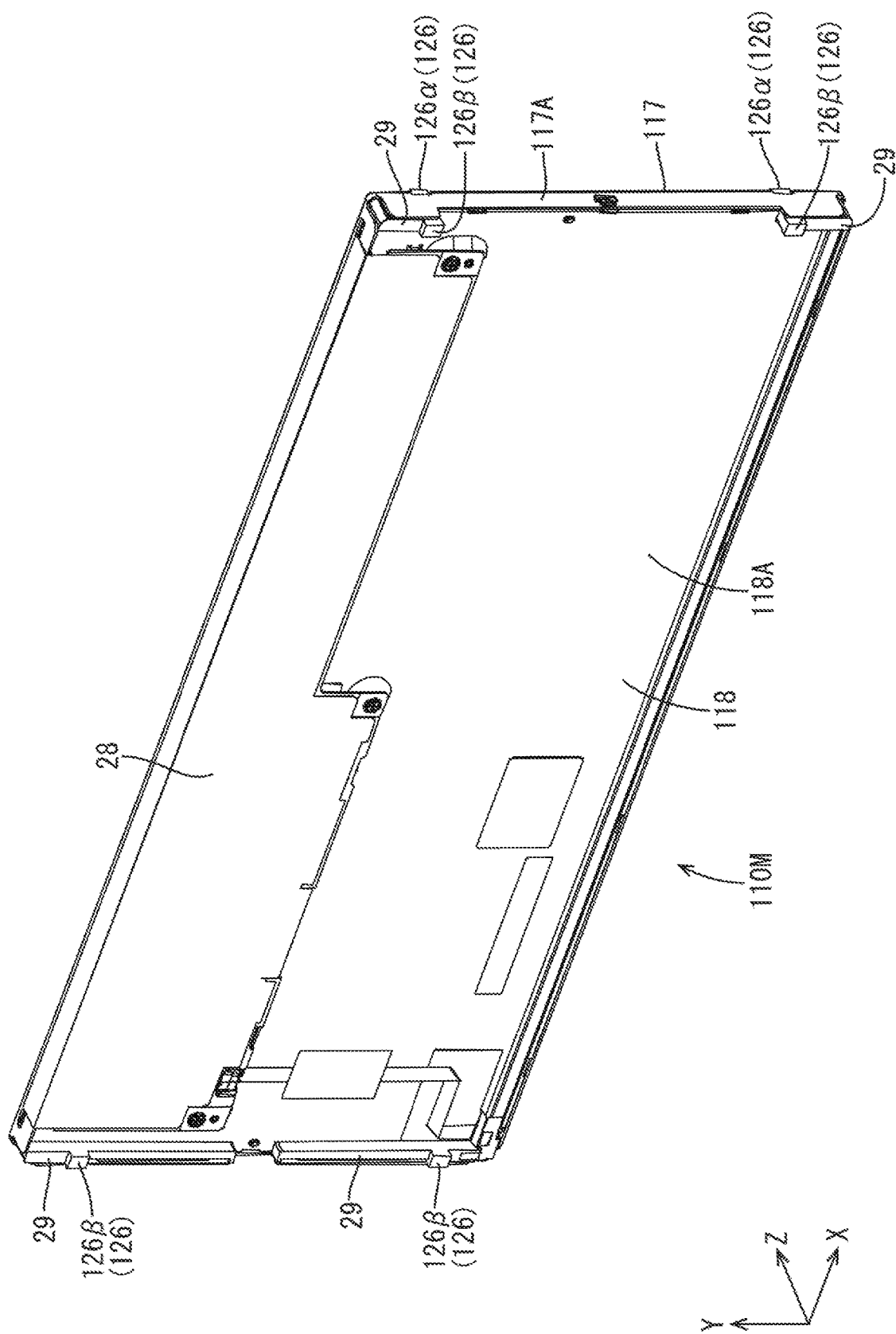
FIG. 3 is an exploded perspective view of a liquid crystal module included in a liquid crystal display device according to a second embodiment.

As illustrated in FIG. 3, the opposite-side spacers 126β are located closer to the ends of the short-side sections of the frame portion 117A extending in the Y-axis direction. As illustrated in FIGS. 3 and 4, the opposite-side spacers 126β are disposed to overlap the display surface-side spacers 126α that protrude from the front surface of the frame portion 117A when viewed in plan. According to the configuration, even if stresses are exerted on the frame portion 117A via the display surface-side spacers 126α and the opposite-side spacers 126β when the liquid crystal module 110M is held between the display surface-side module holding portion 122 and the opposite-side module holding portion 124, shear stresses are less likely to be exerted on the frame portion 117A because the stresses are applied by the display surface-side spacers 126α and the respective opposite-side spacers 126β at the same positions with respect to the perimeter of the frame portion 117A. Therefore, the frame portion 117A of the liquid crystal module 110M is less likely to deform.

The bottom 118A of the chassis 118 is disposed behind the frame portion 117A that includes the circuit board protecting portions 29 and the opposite-side spacers 126β. As illustrated in FIG. 4, the bottom 118A includes opposite-side holes 30 for passing the circuit board protecting portions 29 and the opposite-side spacers 126β. The display surface-side panel holding portion 113A includes holes 127 for passing the display surface-side spacers 126α, which may be referred to as display surface-side holes. The opposite-side spacers 126β are passed through the opposite-side holes 30 to contact the front surface of the opposite-side module holding portion 124. According to the configuration, the opposite-side module holding portion 124 remains separated from the bottom 118A of the chassis 118.

As described above, the spacers 126 include the opposite-side spacers 126β disposed between the frame portion 117A and the opposite side module holding portion 124 on the opposite side from the display surface-side module holding portion 122 on the display surface 111DS with respect to the liquid crystal panel 111. The display surface-side spacers 126α are disposed between the frame portion 117A and the display surface-side module holding portion 122 and thus the display surface-side module holding portion remains separated from the display surface-side panel holding portion 113A. The opposite-side spacers 126β are disposed between the frame portion 117A and the opposite-side module holding portion 124 and thus the opposite-side module holding portion 124 remains separated from the opposite-side panel holding portion 117B. Stresses are less likely to be exerted on the display surface 11DS and the opposite surface of the liquid crystal panel 111. This configuration is preferable for maintaining display quality of the liquid crystal panel 111.

The display surface-side spacers 126α and the respective opposite-side spacers 126β are disposed to overlap. In the liquid crystal module 110M, stresses are exerted on the frame portion held between the display surface-side module holding portion 122 and the opposite-side module holding portion 124, which are a pair of module holding portions, via the display surface-side spacers 126α and the opposite-side spacers 126β. Because the display surface-side spacers 126α and the respective opposite-side spacers 126β are disposed to overlap, shear stresses are less likely to be exerted on the frame portion 117A in the liquid crystal module 110M.

Therefore, the frame portion 117A in the liquid crystal module 110M is less likely to deform.

The liquid crystal module 110M includes the chassis 118 disposed on the opposite side from the display surface-side panel holding portion 113A of a bezel 113 with respect to the frame portion 117A. The chassis 118 includes the bottom 118A and supports the frame 117. The bottom 118A of the chassis 118 includes the opposite-side holes for passing the opposite-side spacers 126β. The opposite-side spacers 126β are passed through the opposite-side holes in the bottom 118A of the chassis 118 and disposed between the frame portion 117A of the frame 117 and the opposite-side module holding portion 124 on the opposite side from the display surface 111DS with respect to the liquid crystal module 110M. According to the configuration, the opposite-side module holding portion 124 disposed on the opposite side from the display surface 111DS with respect to the liquid crystal module 10M remains separated from the opposite-side panel holding portion 117B of the frame 117.

The liquid crystal module 110M includes the control circuit board 28 for controlling the image display on the liquid crystal panel 111. The control circuit board 28 is disposed on the opposite side from the display surface 111DS with respect to the liquid crystal panel 111. The frame portion 117A includes the circuit board protecting portions 29 that protrude in the opposite direction from the display surface-side panel holding portion 113A of the bezel 113. The circuit board protecting portions 29 are disposed outer than the control circuit board 28. Therefore, a foreign object is less likely to contact the control circuit board 28 and the control circuit board 28 is protected. The opposite-side spacers 126β are provided using the circuit board protecting portions 29. The opposite-side spacers 126β protrude outward from the circuit board protecting portions 29. According to the configuration, the control circuit board 28 is further properly protected.

Other Embodiments

The technology described herein is not limited to the embodiments described above and with reference to the drawings. The following embodiments may be included in the technical scope.

(1) The technology described herein may be applied to spacers integrally formed with the frame portion of the frame and the module holders, respectively.

(2) The spacers may be prepared separately from the frame or the module holder and fixed to the frame or the module holder with adhesives.

(3) The locations and the number of the spacers or the area of the frame portion which the spacers are formed may be altered where appropriate. For example, the spacers may be disposed at the middle of each short-side section of the frame portion. The spacers may disposed at long-side sections of the frame portion. The spacers may have elongated shaped that extend parallel to extending directions of the short-side sections and the long-side sections of the frame portion. Only one spacer or three or more spacers may be provided at each short-side section or the long side section.

(4) Each hole and the corresponding locking hole may be formed so as not to communicate with each other.

(5) A modification of the second embodiment may include the opposite-side spacers but not the display surface-side spacers.

(6) In the second embodiment, the circuit board protecting portions may be omitted and the opposite-side spacers may be formed to protrude from the back surface of the frame portion.

(7) The circuit board protecting portions in the second embodiment may be provided at the frame in the first embodiment.

(8) The chassis may include the bottom and sidewalls that project from outer edges of the bottom. The sidewalls may be opposed to the outer side surfaces of the frame portion of the frame and disposed to overlap the side portions of the bezel.

(9) The bezel may include locking protrusions that protrude from sides of the bezel and the frame portion of the frame may include locking recesses that receive the locking protrusions.

(10) The configuration of the module holder may be altered where appropriate. For example, the first member may have the frame shape and the second member may have a box shape with an opening on the front side. The module holder may be configured as a single component.

(11) The first member and the second member may be fixed together with a fixing method other than the bosses and screws. For example, one of the first member and the second member may include locking tabs and the other one of the first member and the second member may include locking portions to which the locking tabs are locked.

(12) The types, the number, and the sequence of the optical sheets in the lighting device may be altered where appropriate.

(13) The edge type backlight unit may be replaced with a direct backlight unit.

(14) The technology described herein may be applied to a reflection type liquid crystal display device configured to display images using ambient light. The reflection type liquid crystal display device does not require the backlight unit. The technology described herein may be applied to a transfection type liquid crystal display device.

(15) The technology described herein may be applied to other types of display panels such as plasma display panels (PDPs), organic EL panels, electrophoretic display (EPD) panels, and micro electro mechanical systems (MEMS) display panels. The organic EL panels do not require the backlight unit.

The invention claimed is:

1. A display device comprising:
a display module comprising:
a display panel configured to display images; and
a panel holder including:
a frame portion surrounding the display panel; and
a pair of panel holding portions to sandwich an outer edge portion of the display panel in a thickness direction of the display panel;
a module holder including a pair of module holding portions to sandwich an outer edge portion of the display module in the thickness direction; and
at least one spacer disposed between the frame portion and at least one of the module holding portions so that the at least one of the module holding portions remains separated from at least one of the panel holding portions, wherein
the at least one spacer includes a display surface-side spacer disposed between one of the module holding portions on a display surface side with respect to the display panel and the frame portion, the panel holder comprises:
a bezel including one of the panel holding portions on the display surface side with respect to the display panel; and
a frame including the frame portion and one of the panel holding portions on an opposite side from the display surface side with respect to the display panel, and the panel holding portion of the bezel includes a display surface-side hole for passing the display surface-side spacer.

2. The display device according to claim 1, wherein
the frame includes a locking portion protruding from a side surface of the frame portion on as opposite side from the display panel side,
the bezel includes a sidewall opposed to the sidewall of the side surface of the frame portion,
the sidewall includes a locking hole with an opening edge to which the locking portion inserted in the locking hole is locked, and
the locking hole communicates with the display surface-side hole.

3. The display device according to claim 1, wherein
the at least one spacer includes an opposite-side spacer disposed between the frame portion and one of the module holding portions on an opposite side from the display surface side with respect to the display panel.

4. The display device according to claim 3, wherein the display surface-side spacer and the opposite-side spacer are disposed to overlap each other.

5. The display device according to claim 3, wherein
the display module comprises a chassis including a bottom disposed on an opposite side from a panel holding pylon side with respect to the frame portion to support the frame, and
the bottom of the chassis includes an opposite-side hole for passing the opposite-side spacer.

6. The display device according to claim 3, wherein
the display module comprises a control circuit board for controlling image display on the display panel,
the control circuit board is disposed on the opposite side from the display surface side with respect to the display panel,
the frame portion includes a circuit board protecting portion protruding in an opposite direction from the panel holding portion side at a position outer than the control circuit board, and
the opposite-side spacer protrudes outward from the circuit board protecting portion.

7. The display device according to claim 1, wherein the at least one spacer includes a plurality of spacers disposed at intervals along a perimeter of the frame portion.

8. The display device according to claim 1, wherein the at least one spacer is integrally formed with the frame portion.

9. The display device according to claim 1, wherein the display panel and the surface-side spacer are disposed not to overlap each other in a thickness direction of the display panel.

10. The display device according to claim 4, wherein the display panel and the surface-side spacer are disposed not to overlap each other in a thickness direction of the display panel.

* * * * *